Oct. 6, 1959
J. C. CALKINS
2,907,111
TUBING CALIPER
Filed April 11, 1958
4 Sheets-Sheet 1
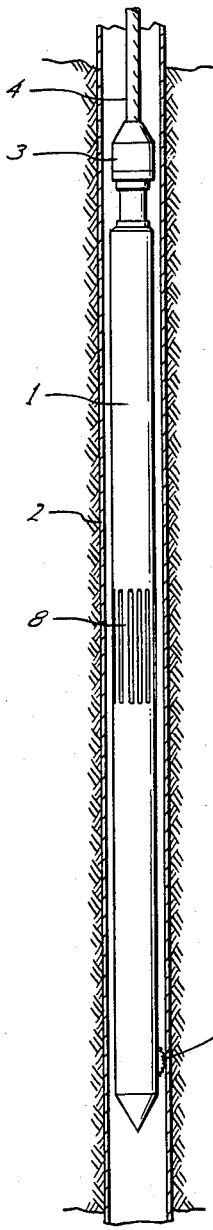
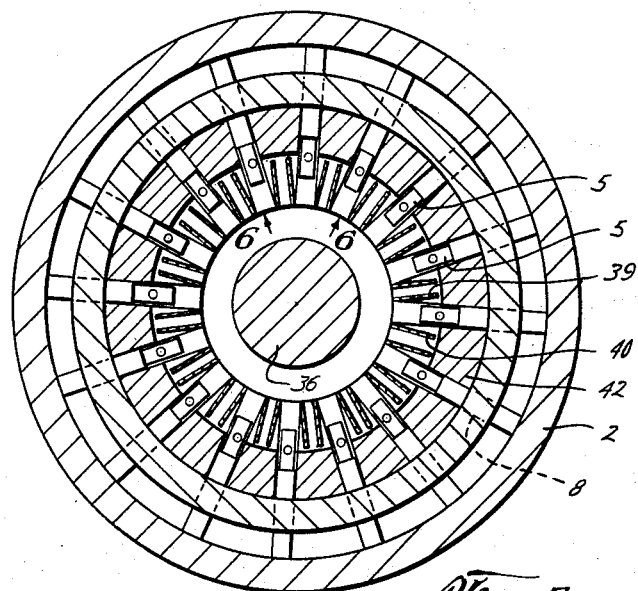
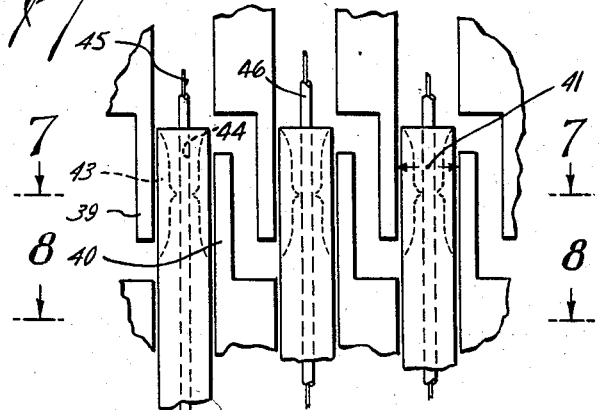
John C. Calkins
INVENTOR.
BY *Arnold and Stidham*
ATTORNEYS

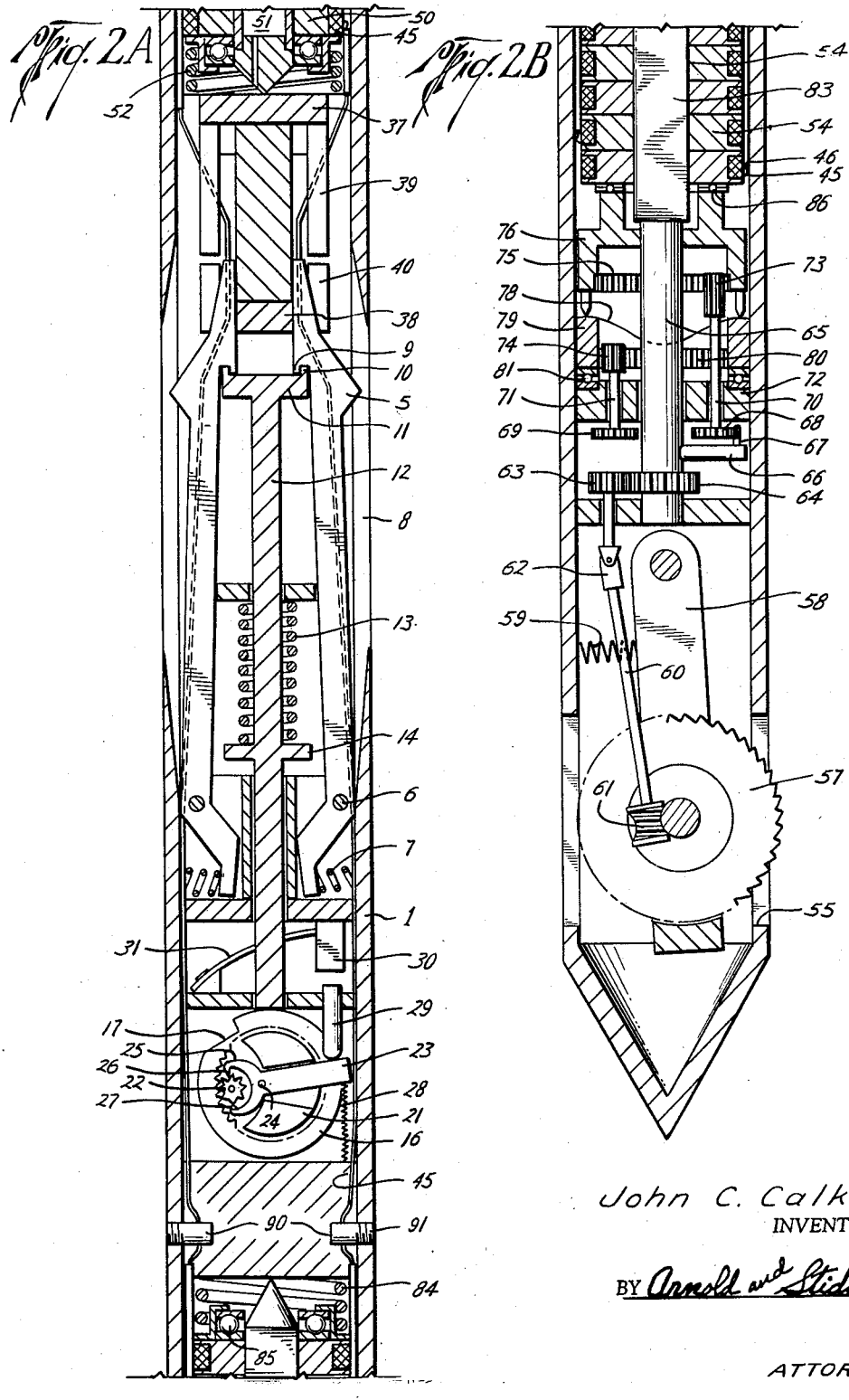

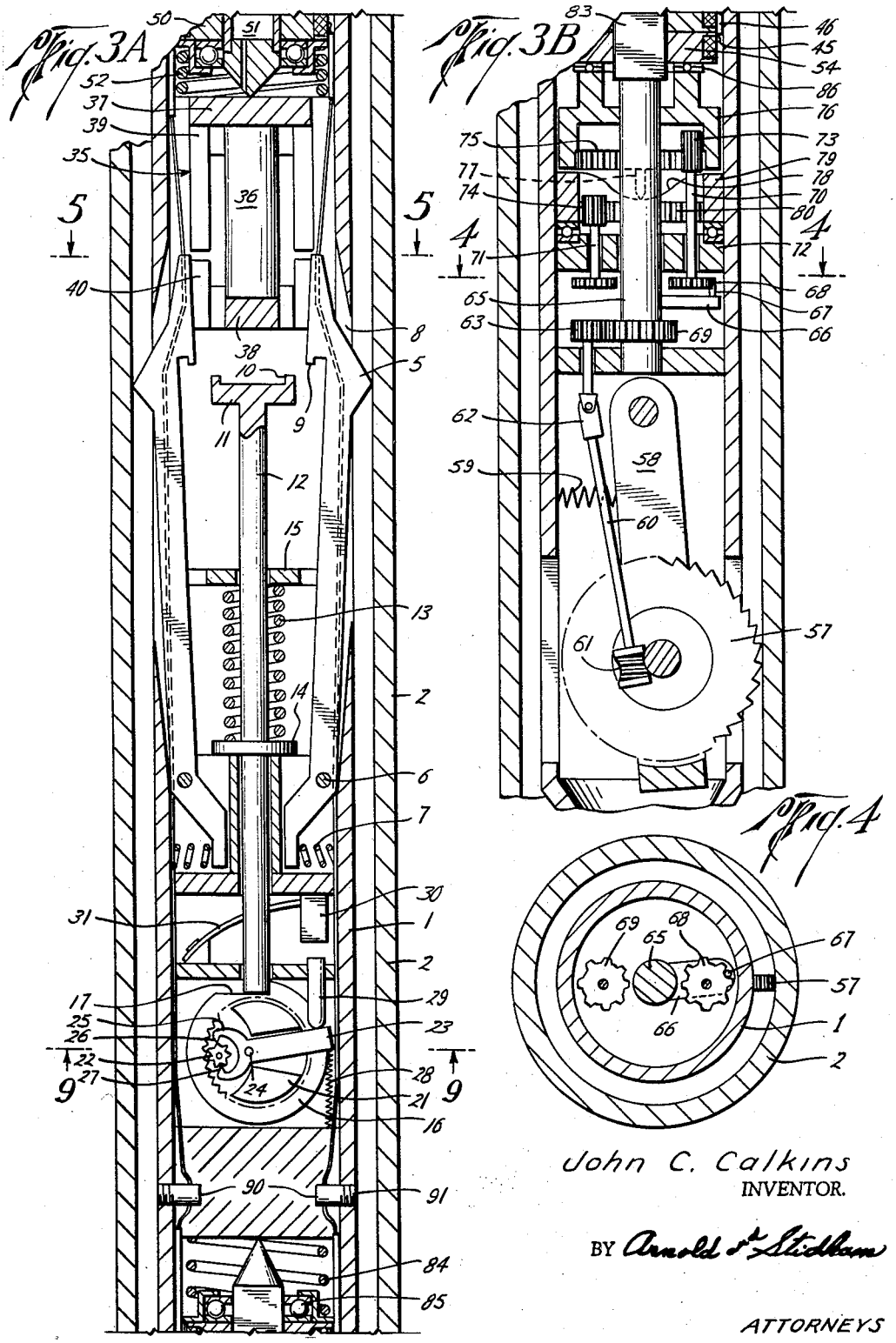

Oct. 6, 1959 J. C. CALKINS 2,907,111
TUBING CALIPER
Filed April 11, 1958 4 Sheets-Sheet 4
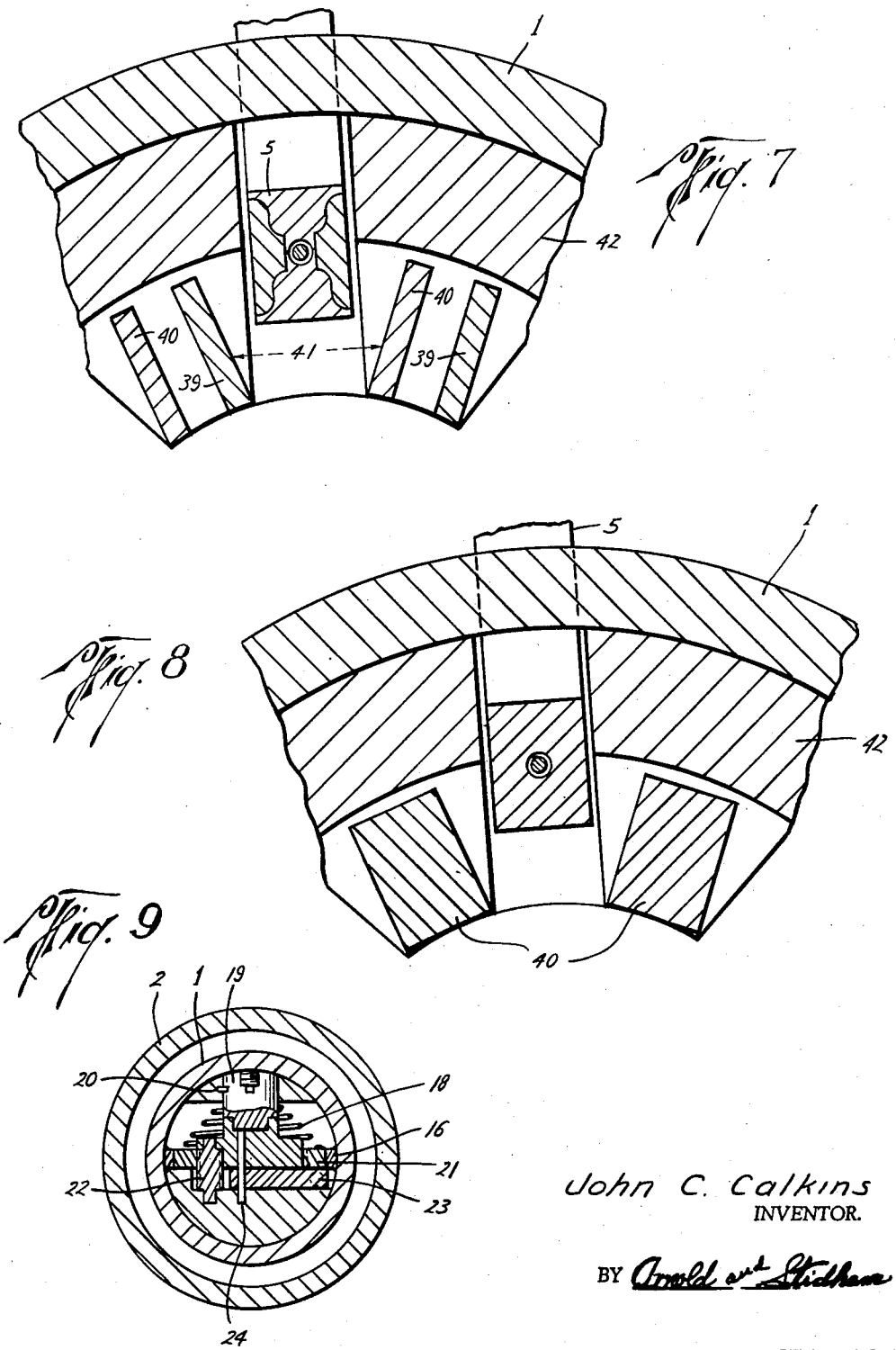
John C. Calkins
INVENTOR.
BY Arnold and Stidham
ATTORNEYS

United States Patent Office 2,907,111
Patented Oct. 6, 1959

2,907,111

TUBING CALIPER

John C. Calkins, Houston, Tex., assignor to Tuboscope Company, Harris County, Tex., a corporation of Delaware Application April 11, 1958, Serial No. 727,951

32 Claims. (Cl. 33—178)

This invention relates to tubing calipers and, more particularly, to a device for measuring and recording pits, cracks and corrosion depressions in the inner surface of oil well tubing or casing in the well.

Tubing calipers adapted to indicate pitting and corrosion in tubular members have been in use for some time but such devices usually consist merely of mechanical linkages which are frequently cumbersome, complex and incapable of measuring and detecting the full extent of corrosive pitting. Moreover, since such devices usually include a recording device which is actuated only by maximum movement of the feelers, only the particular pit of maximum depth at a given well depth will be recorded. Consequently, the circumferential extent of pits or cracks cannot be detected.

More recently, efforts have been made to record pits and cracks electrically as, for example, by use of electromagnetic recording means. Such efforts have, however, met with little success primarily because of the tremendous power requirements necessary to operate electrical or electronic equipment at the vast depths frequently encountered in oil well drilling production today. Moreover, the difficulty of achieving a constant veloctiy of the recording medium prevents the recordation of signals which can be interpreted from amplitude and wave length into a significant analysis.

It is, therefore, an object of this invention to provide a tubing caliper capable of detecting and recording all pits or irregularities around the circumference of a tubing or casing at all depths through which it is moved.

It is a further object of this invention to provide a tubing caliper capable of recording magnetically the depth of pits or corrosion without requiring the delivery of electrical power to the instrument in the well.

It is a further object of this invention to provide wire recording means to indicate deflection of the feelers during movement through a casing which do not require constant control of wire velocity.

It is a further object of this invention to provide mechanism for actuating positively my caliper to prevent inadvertent extension of the feelers.

It is a further object of this invention to provide mechanism for effecting level winding of a magnetic wire used to record operation of my caliper.

It is a further object of this invention to provide a caliper having means for recording signals on magnetic wire indicative of the depth of pits or corrosions including means for winding evenly each wire on a separate reel.

It is a further object of this invention to provide a tubing caliper which is simple and reliable in operation and thorough in its analysis of oil well tubing and casing.

In carrying out my invention, I provide a plurality of longitudinally disposed feelers independently pivoted on the caliper housing with a portion thereof urged into continuous contact with the inner wall of a pipe or casing. During movement of a caliper in a well, a magnetic wire, on which a carrier magnetic signal of a given wave length and a constant amplitude, preferably at saturation intensity of the wire has been previously recorded, is passed longitudinally through a portion of the feeler so as to move radially therewith in response to movement of the feeler over cracks and pits in the inner wall of the casing. A portion of the feeler through which the wire record is passed is situated within an air gap of an erasing permanent magnet circuit. Since the erasing magnet affects only amplitude of the previously recorded signal, the velocity of the wire therethrough need not be correlated accurately with original recording velocity. The air gap is so formed that it increases in width toward the outside of the housing, i.e. toward the outer movement of the feeler portion therein. Consequently, the density of the flux in the air gap and, hence, the amount of magnetic signal erased from the portion of the wire then in the gap will reflect the radial displacement of its associated feeler. The wire is passed through the feeler as the caliper is moved through the tubing so that the resultant magnetic signals along the length of the wire reflect variations in internal diameter along the length of the tubing. Thereafter, the wire is wound upon a plurality of spools rotated automatically during movement of the caliper through the tubing in association with a unique device for winding the wire evenly across the length of the spool.

Further objects and advantages of my invention will become apparent from the specification following when read in view of the accompanying drawings wherein:

Fig. 1 is a view of my caliper in place in a well;

Figs. 2 and 3 are cross-section views of my calipers showing the inactive and active conditions of the feelers respectively;

Fig. 4 is a section view taken along line 4—4 of Fig. 3;

Fig. 5 is a section view taken along line 5—5 of Fig. 3;

Fig. 6 is a partial section view taken along line 6—6 of Fig. 5;

Figs. 7 and 8 are partial section views taken along lines 7—7 and 8—8 of Fig. 6, respectively and showing elements of the erasing magnetic circuit; and Fig. 9 is a section view taken along line 9—9 of Fig. 3.

Referring now to the drawings, my tubing caliper is contained within an elongate, cylindrical housing 1 of a diameter to enable it to be lowered freely through well casing, drill pipe or the like 2 suspended at its upper end by means of a coupling member 3 connecting the housing to the lower end of a wire line or the like 4. Contained within the housing is a plurality of feelers 5 numbering sixteen or more, each independently pivoted at 6 to the housing 1. Each feeler 5 is urged radially outward by resilient means such as a coil spring 7 through one of a circumferential series of windows 8 toward engagement with the inner surface of the well casing 2.

Referring now to Fig. 2A, the feelers 5 are shown in their normal, retracted position in which they are disposed while the housing 1 is being lowered into the well to a depth at which calipering operations may be commenced. That is, my caliper is adapted to be operated while moving upwardly through the casing 2. Therefore, it is advantageous to retract the feelers out of engagement with the casing so that it may be lowered freely. For this purpose, lug 9 extending axially from each caliper is received within an annular axial flange 10 on a feeler holding member 11 carried at one end of an axially slidable rod 12. The rod is normally urged downwardly in Figs. 2A and 3A by means of a coil spring 13 engaging a radial flange 14 on the rod 12 and an internal flange 15 on the housing but such movement is normally prevented by engagement of the extremity thereof with the peripheral surface of a blocking wheel 16 rotatable within the housing. A recess 17 is provided in the surface of the blocking wheel 16 so that when the wheel 16 is rotated from the position shown in Fig. 2A to a point below the end of the slidable rod, as shown in Fig. 3A, the recess 17 permits further downward movement of the rod sufficient to release the locking member flange 10 from the feeler lugs 9 and permit extension of the feelers 5 under force of the individual springs 7.

Rotation of the wheel 16 to present the depression 17 to the end of the detent rod is preferably accomplished by means of a clock spring or the like 18 secured between the wheel 16 and a winding mechanism 19 engageable from outside the housing by a screwdriver and thereby rotatable in one direction to increase tension on the spring 18. Any conventional means such as a pawl and ratchet mechanism 20 may be employed to prevent reverse rotation of the winding mechanism 19. An internal gear 21 in the wheel 16 is engaged by a holding gear 22 in turn held against rotation by an escapement rocker 23 pivoted at 24. A yoke 25 at one end of the rocker 23 has opposing teeth 26 and 27 only one of which is brought into engagement with the holding gear at each end of the pivotal movement followed by the rocker 23. The rocker is normally urged upward by spring 28 to hold upper tooth 26 in engagement to prevent rotation of the gear 22 and, hence, wheel 16. When the rocket is driven downward by a pin 29, the upper tooth 26 releases the holding gear 22 which is instantly engaged by the lower tooth 27. This action of the engagement rocker permits movement of the gear through an arc represented by one-half the distance between teeth. When force on the pin 29 is released, the spring 28 returns the rocker to its elevated position to complete a full one-step movement of the wheel 16. Downward movement of the pin 29 is accomplished by an inertia member or hammer 30 carried above the pin by a leaf spring 31. The inertia member is arranged so that a jerk on the housing 1 through the wire line 4 will drive it into impact with the pin 29. Thus, the wheel 16 can be set initially so that a predetermined number of jerks on the wire line will operate to disengage the feelers 5. The wheel 16 will step along keeping the depression 17 out of releasing position under the required number of impacts that have been imparted to the pin 29. This is an important safety feature that prevents release of the feelers in response to inadvertent bumping of the tool while it is being lowered into the well. While the preferred embodiment of my release mechanism is shown in Fig. 2A and Fig. 9—a simple plunger pawl associated with a ratchet on the wheel 16 can also be used to produce a step by step rotation in response to impacts delivered by inertia member 30.

After the feelers are released, the housing 1 is raised through the tubing to cause each feeler 5 to move in and out in response to movement thereof over pits and cracks in the tubing. The material features of my invention relate to means and mechanisms for recording the extent and time such movements occur in each feeler.

Adjacent the active ends of the feelers 5 is a permanent magnet circuit 35 comprising a permanent magnet core 36 having magnetically permeable pole pieces 37 and 38 of soft iron or the like in intimate contact with each polar end thereof. Extending downwardly from the upper pole piece 37 in parallel spaced relation to the magnet core is a circumferential array of soft iron bars 39 terminating above the lower pole piece 38. Extending upwardly from lower pole piece 38 is a second series of soft iron bars 40. The bars 39 are reduced in width at their ends so that they overlap in spaced relation, a non-magnetic gap 41 (Fig. 6) occurring between the reduced width ends of staggered ones of the upper and lower reluctance path bars 39 and 40. The flux path bars 39 and 40 are preferably carried within a plurality of non-magnetic carrier members 42 of brass or the like (Figs. 7 and 8) and thereby secured to the housing 1. Referring to Figs. 5 and 7, it will be noted that the carrier members are themselves separated to provide a space therebetween for accommodation of the end of a feeler 5. Carried on the sides of each feeler 5 within the slots is a pair of soft iron inserts 43. These inserts afford a low reluctance bridge for flux flow between an upper bar 39 and the adjacent lower bar 40 across the non-magnetic gap 41. As shown in Fig. 6, each insert is reduced in longitudinal cross section to near knife-edge immediately adjacent a longitudinal passageway 44 through the feeler through which a magnetic wire 45 is passed. Thus, flux is concentrated by the inserts to flow through the wire 45 in a narrow stream. It will be noted that the knife-edges are not in transverse alignment so that a longitudinal component of flow is imparted to the flux as it passes through the wire 45. Preferably, the wire is passed throughout its entire length except adjacent the inserts 43 through a small flexible tube 46 in order to prevent contact of well fluids therewith.

Before the caliper 1 is placed in the well, the magnetic wire 45 is impressed with an A.C. carrier signal of the highest possible amplitude and shortest possible wave length. As is well known, the wire is thus converted into a longitudinal series of small permanent magnets alternating in direction of polarity along the entire length. When the wire with a saturating A.C. signal is passed through a permanent magnetic field acting the length thereof, the amplitudes of magnetic signals of a given direction of magnetization will be reduced or even erased. In my invention, the erasing magnetic signal is provided by an intense magnetic field bridging the inserts 43 diagonally between the misaligned knife-edges. This diagonal magnetic field, of course, necessarily includes a longitudinal component which erases a portion of the longitudinal carrier signal on the wire.

Referring to Figs. 5, 7 and 8, it can be seen that while the sides of the slots receiving the feelers 5 are parallel, the non-magnetic gap 41 between adjacent flux path bars 39 and 40 increases with radius. That is, the two bars 39 and 40 on opposite sides of each feeler 5 are disposed radially and not parallel to each other. Consequently, as the feeler 5 moves radially outward the non-magnetic gaps 41 between it and flux path bars 39 and 40 on each side thereof are increased to provide greater reluctance to flow of flux therethrough and, hence, an erasing magnetic field through the wire 45 of lower intensity. Since more of the magnetic signal will be erased when the feeler is retracted, it follows that the residual magnetic signal left on the wire 45 after passing between the knife-edge flux path members 43 will reflect the radial disposition of the feeler and, hence, the internal radius of the tubing or casing.

The magnetic wire 45 is carried on a series of reels 50 rotatable on a shaft 51 fixed within the housing 1. Preferably, a coil spring 52 or the like engages a side of the lowermost reel to maintain the pressure on the wires 45. From each supply reel 50 a wire 45 is taken off tangentially and fed through protective tubing 46, extending from the supply reel 50 through a feeler 5 to a point adjacent a winding reel 54 at the lower end of the housing 1. The operation of the winding reel will now be described in greater detail.

Extending through a window 55 in the housing 1 is a drive wheel 57 on an arm 58 pivotally carried on the housing and normally biased outwardly by any spring means 59 into engagement with the inner surface of the well tubing 2. Preferably, the outer surface of the drive wheel is serrated to provide positive engagement with the well casing to be driven thereby as the housing 1 is raised therethrough. A shaft 60 is journaled within the housing and rotated by drive wheel 57 through any conventional means such as a worm 61. Connected to the upper end of the shaft 60 is a universal joint 62 by means of which a stub shaft carrying a gear 63 is driven to drive, in turn a gear 64 on a main shaft 65. Thus rotation of the drive wheel 57 by engagement with the inner surface during upward movement of the housing produces rotation of the main shaft 65. Extending from the main shaft 65 is an arm 66 on which is carried a pin 67 engageable alternately with a pair of star wheels 68 and 69, keyed onto shafts 70 and 71 respectively, Figs. 2B and 4 journaled in a bearing member 72 fixed to the housing 1. On each shaft 70 and 71 is keyed a pinion 73 and 74, respectively. Drive pinion 73 engages an internal gear 75 carried on a rotatable motion transmitting member 76 from which are extended cam followers 77. Thus, as pinion 73 rotates to drive motion transmitting member 76 to cause the followers 77 thereon to ride upon and down the intelligence surface 78 of an associated cam 79, axial movement is imparted thereto. However, while the followers 77 are revolving the other drive pinion 74 engages an internal gear 80 on the cam 79 so that it is rotated simultaneously on bearings 81. The gear ratios between pinion 73 and ring gear 75 and between pinion 74 and ring gear 80 are established so that the cam follower rotates at a rate slightly different from that of the cam. Consequently, the reciprocal movement of motion transmitting member 76 is at a greatly reduced rate.

The take-up reels 54 for the magnetic wires 45 are carried on a square extension 83 of main shaft 65 so as to be rotated therewith and slidable therealong. The reels are urged normally downward by a coil spring 84 engaging the end of an anti-friction device 85 disposed between the spring and the take-up reels 54 to permit relative rotation therebetween. However, the reels are moved upwardly by motion transmitter 76 as the cam followers 77 move onto the hill of the intelligence surface 78 as shown in Fig. 2B. Preferably, a ball thrust bearing 86 or the like disposed between the reels and the motion transmitting member 76 facilitates relative rotation therebetween. By the same taken, it is obvious that as the cam follower 77 passes onto the valley of the intelligence surface 78 as shown in Fig. 3B, the coil spring 84 will urge it downwardly.

As the relative rotation between the cam follower and the cam produces a reciprocating motion of the reels along the square shaft, the magnetic wire 45 is being drawn off the stationary end of the protecting tube 46 to wind onto the take-up reels evenly along the surface thereof. Since the arm carrying the pin moves the star wheels 68, 69 along only one step during rotation of the shaft 65 and since the effective rotation of the cam follower 77 along the intelligence surface 78 is further reduced by producing the afore-described differential rotation of the cam itself, it can be seen that the reciprocation of the reels is at an extremely low rate compared to the rotation of the main shaft 65. This ratio is determined by the reel size and wire width to achieve level winding i.e. an even distribution of the wire 45 across the width of the take-up reels 54. It is also contemplated that the wire protector tubes may be supported on a single slidable carriage which, if associated with a similar cam, will produce the desirable relative reciprocation between the take-up reels 54 and the wire guides.

Preferably, I also include within the housing 1 a series of playback heads 90, one receiving each of the magnetic wires 45. Thus, when the caliper 1 is removed from the well appropriate drive means can be introduced to wind the magnetic wires 45 from the take-up reels 54 back onto the supply reels 50 at a controlled velocity, each wire passing through a playback head 90. Access is provided through plugs 91 to each playback head 90 to permit connection of appropriate wiring. Of course, if desired, the playback of signals on wires 45 may be done in the laboratory after removal of the take-up reels 54 from the housing.

It is believed that the operation of my caliper will now be clearly understood. When a sufficient number of jerks is imparted to the housing 1 to force inertia member 30 into repeated impacts with the pin 29 and affect stepping of the blocking wheel 16, the feelers 5 will be released to condition my apparatus for a recording operation. The magnetic wires 45 upon which a saturation A.C. carrier signal has been recorded are passed from supply reels 50 through the feelers and thence onto take-up reels 54. As the housing 1 is moved through the casing, the feelers move in and out in response to engagement with irregularities in the surface of the casing. A magnetic wire 45 moves with each feeler 5 within the magnetic field bridging the low reluctance pole extension bars 39 and 40 on opposite sides thereof. This field effects a partial erasure of the magnetic signal proportionate to its intensity. Since the intensity of this field varies with radius, the amount of signal remaining on the wire will be indicative of the radial deposition of the wire, and consequently, of the feeler through which it is passed. Since the wire 45 is pulled through the erasing circuit 35 in response to movement of the drive wheel 57 over the inner surface of the casing 2, each increment of length of wire wound on take-up reels 54 is proportional to an increment of well depth. Consequently, location of pits or cracks indicated by the recording can be determined directly. As the wire is wound onto take-up reels 54 relative reciprocation between the reels and wire guide means effects level winding of the wire on the reels.

While I have shown particular embodiments of my invention, I do not wish to be limited thereto, it being understood that many modifications and changes can be made within the spirit and scope of my invention defined by the claims appended hereto.

Having described my invention, I claim:

1. In a tubing caliper comprising a body adapted to be moved longitudinally through a tubular member, a feeler pivotally mounted on said body, and means urging said feeler outward into engagement with the inner surface of said tubular member, the combination with said feeler of mechanism for recording pivotal movement of said feeler in response to longitudinal movement thereof over irregularities in said inner surface comprising an erasing magnetic field producing lines of magnetic flux transverse to the path of said pivotal movement, the intensity of said magnetic field varying with distance from the center of said body, a portion of said feeler being disposed in said magnetic field to move radially therein, an elongate magnetic record medium having a magnetic signal of predetermined intensity thereon, a slideway on said feeler portion slidably receiving said record medium for radial movement therewith, and means for moving said record medium longitudinally through said slideway when said body is moved through said tubular member.

2. In a tubing caliper comprising a housing adapted to be moved longitudinally through a tubular member, a longitudinally disposed feeler pivotally mounted in said housing for movement outward therefrom, and means urging said feeler outward into engagement with the inner surface of said tubular member, the combination with said feeler of mechanism for recording pivotal movement of said feeler in response to longitudinal movement thereof over irregularities in said inner surface comprising a magnetic circuit in said housing including a non-magnetic gap having lines of magnetic flux therein transverse to the pivotal movement of said feeler, said gap having the ends thereof radially disposed whereby flux density produced therein decreases with the distance from the center of said housing, a portion of said feeler being radially movable within said gap, a slideway on said feeler portion, an elongate magnetic record medium slidable longitudinally through said slideway but being movable radially therewith, and means for moving said record medium longitudinally when said housing is moved through said tubular member.

3. In a tubing caliper comprising a housing adapted to be moved longitudinally through a tubular member, a feeler pivotally mounted on said housing, and means urging said feeler outward into engagement with the inner surface of said tubular member, the combination with said feeler of mechanism for recording pivotal movement of said feeler in response to longitudinal movement thereof over irregularities in said inner surface comprising a signal erasing magnetic circuit including a non-magnetic gap having lines of magnetic flux therein transversely across the path of pivotal movement of said feelers, said gap having the ends thereof radially disposed whereby the density of said lines of flux decreases with distance from the center of said housing, a pair of angularly spaced low reluctance members carried on said feeler for radial movement within said gap, said low reluctance members being disposed substantially parallel to said path of pivotal movement and transverse to said lines of flux to provide an interrupted path for flux flow across said gap, a slideway on said feeler intermediate said low reluctance members, an elongate magnetic record medium having a magnetic signal of predetermined intensity thereon slidably received in said slideway between said low reluctance members, said slideway moving said record medium radially with said low reluctance members, and means for moving said record medium longitudinally in response to movement of said housing through said tubular member.

4. The tubing caliper defined in claim 3 wherein said low reluctance members are of finite longitudinal extent so that lines of flux in said gap passing between said low reluctance members are concentrated to pass through said record medium over a finite portion thereof.

5. The tubing caliper defined in claim 3 wherein the cross-sectional areas transverse to said lines of magnetic flux of said low reluctance members decrease toward said slideway to concentrate the density of said flux lines for flow thereof through said record medium.

6. In a tubing caliper comprising a housing adapted to be moved longitudinally through a tubular member, a longitudinally disposed feeler pivotally mounted on said housing and means urging said feeler outward into engagement with the inner surface of said tubular member, the combination therewith of mechanism for indicating radial movement of said feeler comprising a magnetic circuit in said housing including a non-magnetic gap with lines of flux therein transverse to the direction of movement of said feeler, the ends of said gap being radially disposed whereby said lines of flux decrease in density toward the outside of said housing, a portion of said feeler being radially movable within said gap in response to movement of said feeler over irregularities in the inner surface of said tubular member, a pair of low reluctance members carried on opposite sides of said feeler portion, each of said low reluctance members being disposed substantially radially and being adapted to move with said feeler adjacent to one side of said gap, a longitudinal slideway through said feeler portion between said low reluctance members, an elongate magnetic medium received in said slideway for longitudinal movement therethrough, a portion of said magnetic medium received within said slideway being movable radially with said feeler portion, and means for moving said magnetic medium longitudinally as said housing is moved through said tubular member.

7. The tubing caliper defined in claim 6 wherein said low reluctance members taper toward each other to restrict the low reluctance path and thereby concentrate flux flow toward said slideway.

8. In a tubing caliper comprising a housing adapted to be moved longitudinally through a tubular member, a longitudinally disposed feeler pivotally mounted on said housing for inward and outward movement relative thereto, and means urging said feeler outward into engagement with the inner surface of said tubular member, the combination therewith of mechanism for indicating radial movement of said feeler as said feeler is moved over irregularities in said inner surface comprising, a magnetic circuit in said housing including a non-magnetic gap with magnetic lines of flux therein transverse to the direction of movement of said feeler, the ends of said gap being radially disposed whereby the flux density decreases toward the outside of said housing, a portion of said feeler being radially movable within said gap, a pair of low reluctance members carried on opposite sides of said feeler portion, each of said low reluctance members being adapted to move radially with said feeler portion adjacent to one side of said gap, a longitudinal passageway through said feeler portion between said low reluctance members, a supply reel freely rotatable within said housing, a take-up reel rotatably mounted in said housing, a reelable magnetic medium carried on said supply reel threaded through said passageway and wound onto said take-up reel, a portion of said magnetic medium within said passageway being movable radially with said feeler portion, means for rotating said take-up reel upon movement of said housing through said tubular member, and means for effecting level winding of said record medium on said take-up reel.

9. The tubing caliper defined in claim 8 wherein said level winding means comprises a guide member in said housing adjacent said take-up reel and spaced radially therefrom, said record medium being directed from said passageway through said guide means and onto said take-up reel in substantially a radial plane relative thereto, and means for producing relative axial reciprocation between said take-up reel and said guide means during rotation of said take-up reel.

10. In a tubing caliper comprising an elongate body adapted to be moved longitudinally through a tubular member, a longitudinally disposed feeler pivotally mounted on said body and means biasing said feeler outward into engagement with the inner surface of said tubular member, the combination therewith of mechanism for indicating radial movement of said feeler in response to longitudinal movement thereof over irregularities in said inner surface comprising a magnet, a first magnetically permeable member held in contact with one pole of said magnet and extending longitudinally toward but being spaced from the other pole thereof, a second magnetically permeable member held in contact with said other pole and extending longitudinally toward but being spaced from said other pole, said first and second permeable members being angularly offset with the ends thereof in spaced overlapping relationship, the sides of said members being radially disposed, a portion of said feeler being received between said members to move radially therebetween, a slideway on said feeler portion, an elongate record medium received in said slideway for longitudinal movement therethrough and radial movement therewith, and means for moving said record medium longitudinally when said body is moved through said tubular member.

11. A tubing caliper comprising a body adapted to be moved longitudinally through a tubular member, a plurality of longitudinally disposed feelers circumferentially spaced around said body, each of said feelers being pivotally mounted on said body for independent movement thereon, a resilient biasing member associated with each of said feelers to maintain said feelers in engagement with the inner surface of said tubular member, a magnetic circuit including a plurality of non-magnetic gaps circumferentially spaced about said body, each of said gaps receiving a portion of one of said feelers for radial movement therein in response to longitudinal movement of said feeler over irregularities in the inner surface of said tubular member, each of said gaps having the ends thereof disposed radially whereby the density of lines of magnetic flux therein decreases toward the outside of said body, a plurality of elongate magnetic record media, a slideway on each of said feeler portions receiving one of said record media for radial movement therewith, and means for moving said record media longitudinally through said slideways at a common velocity when said body is moved through said tubular member.

12. A tubing caliper comprising a housing adapted to be moved longitudinally through a tubular member, a plurality of circumferentially spaced feelers longitudinally disposed and pivotally mounted on said body, each of said feelers being movable independently outward from said body, a resilient biasing member associated with each of said feelers to urge said feelers into engagement with the inner surface of said tubular member, a magnet in said housing, a first circumferential series of magnetically permeable members extending axially from one pole of said magnet toward the other pole thereof, a second circumferential series of magnetically permeable members extending axially from said other pole toward said one pole, said first and second series of permeable members being angularly offset and overlapping to provide a circumferential series of non-magnetic gaps therebetween, the sides of said permeable members being radially disposed so that each of said gaps increases in dimension with radius, each of said feelers having a portion thereof received in one of said gaps for radial movement therein in response to the movement of said feeler over irregularities in said inner surface of the tubular member, a slideway carried on each of said feeler portions for movement therewith within one of said gaps, an elongate magnetic record medium slidably received in each of said slideways for radial movement therewith, and means for moving all of said record media longitudinally through said slideways at the same velocity in response to movement of said body through said tubular member.

13. The tubing caliper defined in claim 12 including a feeler release mechanism comprising a holding member operative when set to hold all of said feelers in retracted position out of engagement with said inner surface, an inertia member in said housing, an actuator, said inertia member delivering an impact to said actuator upon a predetermined movement of said housing, resilient means normally holding said inertia member out of engagement with said actuator, and means operated by said actuator in response to a fixed number of impacts delivered thereto for releasing said holding member.

14. In a tubing caliper comprising an elongate housing adapted to be moved longitudinally through a tubular member, a plurality of circumferentially spaced feelers pivotally mounted on said body, resilient means biasing said feelers outward, and means operative during longitudinal movement of said feelers against the inner surface of said tubular member to indicate radial disposition of said feelers throughout said longitudinal movement, the combination therewith of a feeler release mechanism comprising a holding member operative when set to hold all of said feelers in retracted position out of engagement with said inner surface, an inertia member, an actuator, said inertia member delivering an impact to said actuator upon a predetermined movement of said body, resilient means normally holding said inertia member out of engagement with said actuator, and means operated by said actuator for releasing said holding member in response to a fixed number of impacts delivered thereto.

15. In a tubing caliper comprising an elongate housing adapted to be moved longitudinally through a tubular member, a plurality of circumferentially spaced feelers pivotally mounted on said housing, resilient means biasing said feelers outward, and means operative during longitudinal movement of said feelers against the inner surface of said tubular member to indicate radial disposition of said feelers throughout said longitudinal movement, the combination therewith of a feeler release mechanism comprising a holding member operative when set to engage all of said feelers and restrain said feelers against outward movement, resilient means biasing said holding member out of engagement with said feelers, a blocking member engaging said holding member in opposition to said resilient means, releasing means for moving said blocking member out of blocking engagement with said holding means, an inertia member, means responsive to an impact delivered by said inertia member to effect an increment of movement of said releasing means, yieldable means normally holding said inertia member out of engagement with said impact responsive means, said yieldable means being overcome by a predetermined movement of said elongate housing.

16. In a tubing caliper comprising an elongate body adapted to be moved longitudinally through a tubular member, a plurality of circumferentially spaced feelers pivotally mounted on said body, resilient means biasing said feelers outward, and means operative during longitudinal movement of said feelers over the inner surface of said tubular member to indicate radial disposition of said feelers throughout said longitudinal movement, the combination therewith of a feeler release mechanism comprising a holding member normally engaging all of said feelers to hold said feelers in a retracted position, resilient biasing means urging said holding member toward disengaging movement, a blocking member normally engaging said holding member to prevent said disengaging movement, biasing means urging said blocking member toward a releasing position enabling disengaging movement of said holding member, an escapement device normally holding said blocking member in opposition to said biasing means but being operative when an impact is delivered thereto to produce an increment of movement of said blocking member, and an inertia member operative in response to a given longitudinal movement of said body to deliver an impact to said escapement device.

17. In a tubing caliper comprising an elongate housing adapted to be moved longitudinally through a tubular member, a plurality of longitudinally disposed circumferentially spaced feelers pivotally mounted on said housing, resilient means biasing said feelers outward, and means operative during longitudinal movement of said feelers over the inner surface of said tubular member to indicate radial disposition of said feelers throughout sand longitudinal movement, the combination therewith of a feeler release mechanism comprising a rod longitudinally slidable on said housing, a holding member on said rod engaging all of said feelers to hold said feelers in a retracted position, biasing means urging said rod in one axial direction to disengage said holding member from said feelers, a wheel mounted for rotation about an axis transverse to the direction of movement of said rod, one end of said rod normally engaging the surface of said wheel to prevent movement of said rod in said one direction, a depression in said surface of the wheel adapted when moved under said one end of the rod to permit disengaging movement thereof, spring means urging said wheel into rotation in a direction to move said depression into releasing position, a pivoted escapement device normally holding said wheel against rotation but releasing said wheel upon pivotal movement thereof to permit rotation of said wheel through an increment of movement, a plunger operative when an impact is delivered thereto to pivot said escapement device, an inertia member operative in response to a predetermined movement transmitted to said housing to deliver an impact to said plunger and yieldable means normally holding said inertia member out of impact with said plunger.

18. In combination with a body having a control member movable thereon along a fixed path, apparatus for moving said control member a predetermined distance along said fixed path in response to a given movement of said housing comprising, biasing means urging said control member along said fixed path, an escapement device normally holding said control member in opposition to said biasing means but being operable when an impact is delivered thereto to release said control member momentarily for movement by said biasing means through an increment along said fixed path, and an inertia mass on said body movable in response to a given movement of said body to deliver an impact to said escapement device.

19. In combination with a body having a control member rotatable on said body, apparatus for rotating said member through a predetermined arc in response to repeated movement of said body comprising, biasing means urging said control member into rotation, a locking wheel positively engaging said control member for rotation therewith, an escapement arm pivotally mounted on said body adjacent the periphery of said locking wheel, a pair of spaced gripping members on said arm, each of said gripping members being operative to limit pivotal movement of said arm in one direction and engage said locking wheel to prevent rotation thereof, pivotal movement of said arm in each direction effecting in sequence disengagement of one of said gripping members from said drive wheel and then engagement of the other of said gripping members with said drive wheel to free said member momentarily for rotation by said biasing means through an increment of rotation along said arc, resilient means normally holding said arm at one limit of its pivotal movement, and an inertia mass on said body movable in response to a given movement of said body to drive said arm to the other limit of its pivotal movement, and resilient means normally holding said inertia mass out of engagement with said arm.

20. In combination with a body having a control member rotatable on said body, the combination therewith of an apparatus for rotating said control member through a predetermined arc in response to repeated movement of said body comprising, biasing means urging said control member into rotation, a locking wheel positively engaging said control member for rotation therewith, an escapement arm pivotally mounted on said body adjacent said locking wheel, a pair of stop members on said escapement arm, said escapement arm being pivotable between a first position wherein only one of said stop members positively engages said lock wheel to prevent rotation thereof and a second position wherein only the other of said stop members engages said lock wheel to prevent rotation thereof, both of said stop members being disengaged from said lock wheel during pivotal movement of said escapement arm between said first and second positions to cause said biasing means to rotate the control member through an increment of movement along said arc, resilient means normally urging said escapement arm in said one position, an inertia mass on said body movable in response to a given movement of said body to deliver an impact to said arm and drive said arm into said second position, and resilient means normally holding said inertia mass out of engagement with said arm.

21. Apparatus for recording reciprocating movements of a member along a given path comprising means for producing a magnetic field along said path with lines of magnetic flux transverse thereto, the intensity of said magnetic field decreasing gradually in one direction along said path of movement, a slideway on said member, an elongate magnetic record medium received in said slideway for longitudinal movement therethrough, and transverse movement therewith, said slideway being disposed within said magnetic field for reciprocating movement therein, and means for moving said record medium longitudinally.

22. Apparatus for recording reciprocating movements of a member along a given path comprising a magnetic circuit including a non-magnetic gap having lines of magnetic flux therein transverse to said given path, the ends of said gap converging in one direction along said path of movement whereby flux density therein varies gradually along said path, a slideway on said member, and an elongate magnetic record medium movable longitudinally through said slideway but being movable therewith along said path, said slideway being disposed within said gap, and means for moving said record medium longitudinally.

23. Apparatus for recording reciprocating movements of a member along a given path comprising a magnetic circuit including a non-magnetic gap so that there is produced a magnetic field across said gap with lines of flux therein transverse to said given path, said gap being gradually reduced in extent in one direction along said path whereby said magnetic field increases in intensity toward said one direction, a portion of said member being disposed in said gap for reciprocating movement therein, a pair of low reluctance members carried on opposite sides of said portion, each of said low reluctance members being adapted to move with said member adjacent to one side of said gap, a longitudinal slideway through said portion between said low reluctance members, an elongate magnetic record medium received in said slideway for longitudinal movement therethrough and reciprocating movement therewith, and means for moving said record medium longitudinally during reciprocation of said member.

24. In a magnetic recording apparatus wherein a record medium is unwound from a freely rotatable supply reel, passed through a magnet device and wound onto a take-up reel, the combination therewith of means for effecting a level winding of said record medium on said take-up reel comprising guide means spaced radially from said take-up reel, said record medium being directed from said magnet device through said guide means and onto said take-up reel in substantially a radial plane, means for rotating said take-up reel about a fixed axis, a rotatable cam mounted on said axis, a follower associated with said cam to produce relative reciprocation of said take-up reel and said guide means upon rotation of said cam, and means for rotating simultaneously said cam and said take-up reel.

25. The combination defined in claim 24 including additional means for rotating said follower simultaneously with said cam and said take-up reel at a different rate of speed than that of said cam.

26. In a magnetic recording apparatus wherein a record medium is unwound from a freely rotatable supply reel, passed through a magnet device and wound onto a take-up reel, the combination therewith of means for effecting a level winding of said record medium on said take-up reel comprising guide means spaced radially from said take-up reel to direct said record medium from said magnet device onto said take-up reel substantially in a radial plane, a shaft on which said take-up reel is mounted for rotation therewith, said take-up reel being slidable axially on said shaft, a rotatable cam mounted coaxially with said shaft, a follower associated with said cam to produce reciprocation of said reel upon rotation of said cam, and means driven by said shaft for producing simultaneous rotation of said cam and said follower at different rates of speed.

27. A magnetic recording apparatus comprising a plurality of supply reels, a plurality of take-up reels, a record medium adapted to be unwound from each of said supply reels, passed through a magnet device and wound onto one of said supply reels, a guide member spaced radially from each of said take-up reels to direct a record medium from one of said magnet devices onto the appropriate take-up reel substantially in a radial plane, a shaft, said take-up reels being mounted side by side on said shaft for rotation therewith and being slidable axially thereon, a rotatable cam mounted coaxially with said shaft, a follower associated with said cam, a pusher member carrying said follower and engaging an end one of said plurality of take-up reels to produce simultaneous reciprocation of said plurality of take-up reels upon rotation of said cam and means for producing simultaneous rotation of said shaft and said cam.

28. The combination defined in claim 27 including additional means for rotating said follower simultaneously with said cam and said shaft at a different rate of speed than that of said cam.

29. In a magnetic recording apparatus wherein a plurality of record media are passed through a magnet recorder and wound onto a plurality of take-up reels, the combination therewith of means for effecting a level winding of said record media comprising a common shaft upon which the take-up reels are mounted side by side for rotation therewith, said take-up reels being slidable axially on said shaft, a guide member spaced radially from each of said take-up reels receiving one of said record media to direct said one record medium onto the appropriate take-up reel in a radial plane, a rotatable cam mounted coaxially with said shaft, a follower associated with said cam, a pusher member engaging said follower and engaging an end one of said plurality of take-up reels to produce simultaneous reciprocation of all of said plurality of reels upon relative rotation between said cam and said follower and means driven by said shaft for producing simultaneous rotation of said cam and said follower at different rates of speed.

30. In a tubing caliper comprising an elongate housing adapted to be moved longitudinally through a tubular member, a feeler pivotally mounted on said housing and means urging said feeler outward into engagement with the inner wall of said tubular member, the combination therewith of mechanism for recording pivotal movements of said feeler as it is moved longitudinally over irregularities on said inner surface comprising a supply reel rotatably mounted on said housing, a shaft extending longitudinally of said housing, a take-up reel carried on said shaft for rotation therewith, said take-up reel being slidable axially on said shaft, a magnetic circuit including a non-magnetic gap traversed by lines of magnetic flux, the ends of said gap being radial so that said gap increases in size toward the outside of said housing, a portion of said feeler being disposed in said gap to move radially therein, a slideway on said feeler portion, a guide member in said housing adjacent to and spaced radially from said supply reel, a magnetic wire carried on said supply reel and fed longitudinally through said slideway and said guide member and wound onto said take-up reel, a cam rotatable in said housing coaxially with said take-up reel, a cam follower associated with said cam, a pusher member carrying said follower, said pusher member being slidable axially in said housing engaging said take-up reel, said cam and follower being operative upon relative rotation therebetween to produce reciprocation of said take-up reel adjacent said guide member, motion transmitting means on said shaft for producing relative rotation of said cam and follower, and drive means for rotating said shaft when said housing is moved through said tubular member.

31. The combination defined in claim 30 wherein said motion transmitting means comprising speed reducing means on said shaft, a first member driven by said speed reducing means for rotating said cam and a second member driven by said reducing means for rotating said follower, said cam and said follower being rotated at different rates.

32. The combination defined in claim 30 wherein said motion transmitting means comprises first drive means for rotating said cam, second drive means for rotating said follower, unit rotation of said first and second drive means producing different rates of rotation of said cam and said follower, and speed reducing means for driving said first and second drive means at a common rate of rotation upon rotation of said shaft.

References Cited in the file of this patent
UNITED STATES PATENTS

| | | |
|---|---|---|
| 2,698,930 | Gutterman | Jan. 4, 1955 |
| 2,740,593 | Zenner | Apr. 3, 1956 |
| 2,799,946 | Mayes | July 23, 1957 |